No. 874,291. PATENTED DEC. 17, 1907.
W. C. BLACK.
SEPARATOR SIEVE.
APPLICATION FILED NOV. 15, 1906.

WITNESSES.
Hazel B. Hiett
Lowell Schreiber

INVENTOR.
William C. Black,
By Owen & Owen,
His attorneys.

UNITED STATES PATENT OFFICE.

WILLIAM C. BLACK, OF PLYMOUTH, OHIO.

SEPARATOR-SIEVE.

No. 874,291.	Specification of Letters Patent.	Patented Dec. 17, 1907.

Application filed November 15, 1906. Serial No. 343,497.

*To all whom it may concern:*

Be it known that I, WILLIAM C. BLACK, a citizen of the United States, and a resident of Plymouth, in the county of Richland and State of Ohio, have invented a certain new and useful Improved Separator-Sieve; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to separator sieves of the class employed more particularly in threshing-machines or the like in which the grain is subjected to a blast of air whereby to separate the light particles of chaff and dust therefrom, and is an improvement over the construction embodied in my United States Letters Patent No. 803,977, dated Nov. 7, 1905.

The primary object of my invention is to simplify, cheapen and strengthen the construction of sieves of the class described by making the wind-guides separate from the sieve proper and mounting them beneath the same for adjustment relative to the mesh or openings thereof, whereby to serve as the necessary braces or supports for such sieve, and also facilitate rather than retard or diverge the blast from the sieve openings, as has been the tendency with the sieves of this class heretofore used.

A further object of my invention is the provision of a sieve of the character described which has the operating mechanism for the wind-guides entirely disposed beneath the sieve frame, thus enabling the placing of two or more sieves end to end, as is sometimes desirable, and obviating the obstruction to the free passage of tailings over the sieve, which is incident to the positioning of the operating crank-shaft at the end of the shaft over the tail-spout of the separator.

Further objects and advantages as well as the operation, construction and arrangement of the parts of the invention, will be apparent by reference to the following description and the accompanying drawings, in which,—

Figure 1:
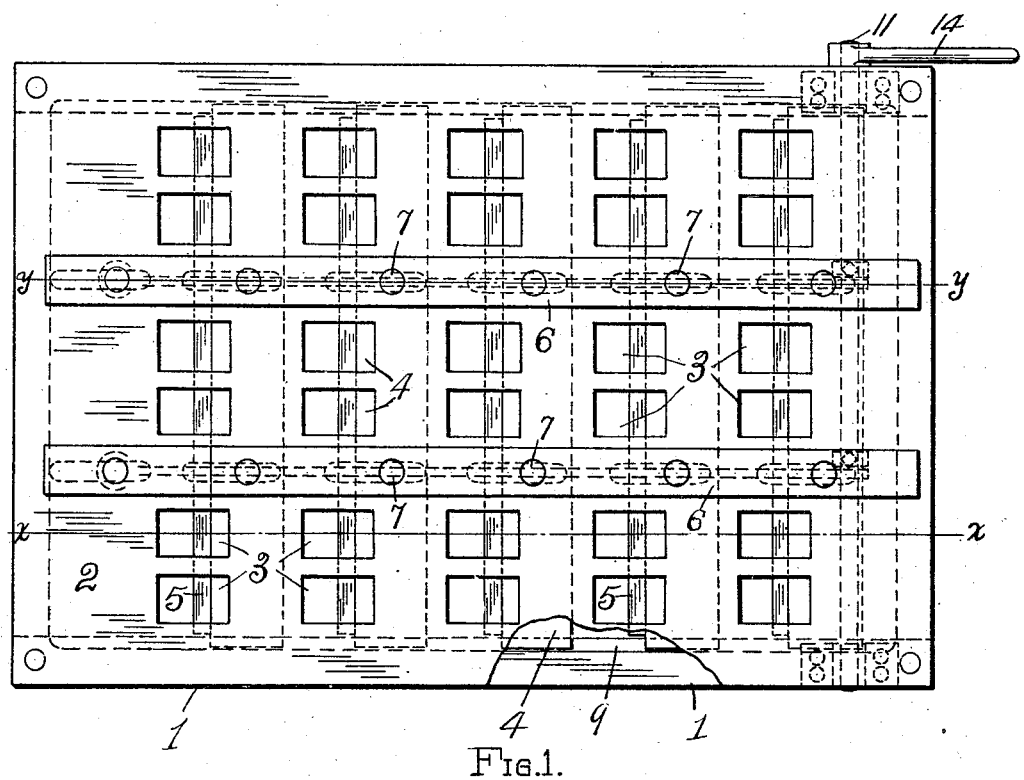
Figure 2:
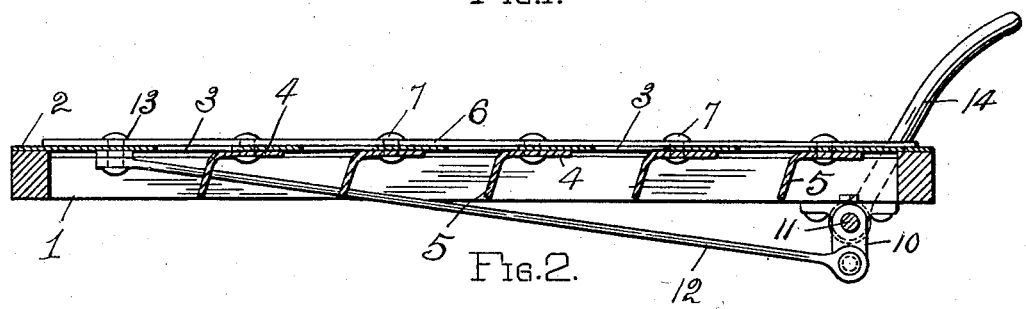
Figure 3:
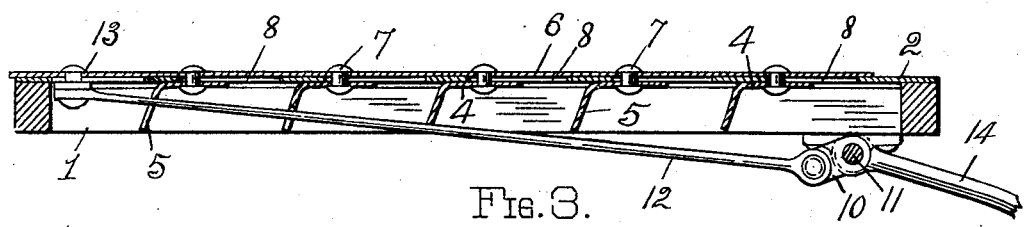

Figure 1 is a top plan view of the sieve embodying my invention with a portion of the mesh or perforated sheet broken away and the wind-guides shown as adjusted to partially close the openings. Fig. 2 is a longitudinal section taken on the dotted line $x$ $x$ in Fig. 1, and Fig. 3 is a similar section taken on the dotted line $y$ $y$ in Fig. 1, with the wind-guides shown as adjusted to substantially close the openings in the sieve.

Referring to the drawings, 1 designates a sieve frame, which may be of any suitable size or construction, and 2 the perforated plate or separating element thereof, which is secured to the top surface of the frame and is provided with a multiplicity of mesh or openings 3 through which the air current and grain pass in opposite directions. These openings are arranged to aline transversely of the sieve and to form a plurality of sets, which are spaced a distance apart longitudinally of the sieve approximately equal to the length of the openings for the purpose of accommodating the shutters or mesh regulating members 4, as shown. These shutters constitute transverse slats or strips, which have the edges thereof contiguous to the openings 3 across which they are adapted to operate formed with dependent or downwardly extending wings 5, which are intended to form wind-guides against which the air blast on the lower side of the sieve strikes and is directed thereby upwardly through the openings. The inclination of these wings may be varied, but is preferably about forty-five degrees. These wings extend entirely across the sieve so that each forms an unbroken wind-guide for a plurality of alining sieve openings to intercept a larger amount of air than is the case where a separate tongue or wing is employed for each mesh or opening. In addition to acting as wind-guides the shutters 4 also serve as truss or supporting members for the separating element 2, the construction thereof and their position relative to such element admirably adapting them for such purpose, thus enabling the usual truss or supporting members to be eliminated so that the sieve is not only lightened quite materially but also cheapened. The several shutters 4 with their dependent wings 5 are retained in sliding contact with the under surface of the perforated plate 2 and in rigid relation to each other by one or more bars 6, which are disposed longitudinally of the sieve in sliding contact with the upper surface thereof and have the shutters fixedly secured thereto by rivets or other suitable securing means 7, which pass through elongated slots 8 in the sieve plate 2 to permit the shutters and their carrier-bars to have a limited reciprocatory movement relative thereto. The shutter strips or slats are preferably extended at the ends slightly beyond the terminals of the wings 5 thereof to adapt them to operate within gained portions 9 of the frame sides, as shown.

Each shutter-carrier-bar 6 has connection with an arm 10 of a rock-shaft 11 through the medium of a connecting-rod 12, which is disposed under the sieve longitudinally thereof and is attached as at 13 to the associated carrier-bar. The rock-shaft 11 is mounted transversely of the sieve below and at one end thereof and has one end projecting beyond the side of the sieve and shaped to receive a turning-crank 14, which is intended to be secured thereon without the casing or wall of the separator or machine with which it is associated. It is thus apparent that a proper adjustment of the shutters 4 relative to the openings 3 of the sieve, whereby to change the size of such openings to suit the kind and condition of grain operated on, may be easily and quickly effected, without necessitating a stopping of the machine, by simply turning the crank 14 in the proper direction and to the proper degree, thereby occasioning a simultaneous adjustment of all the shutters and their attached wind-guides. It is also apparent that the mounting of the rock-shaft and connecting-rods or pitmen in this manner does not necessitate the customary and deleterious notching or cutting-away of portions of the sieve frame to form a passage-way for such rods or pitmen, thereby making a much lighter and stronger sieve than those heretofore employed, as the notching of the frame necessarily weakens it.

With this construction of sieve the air blast, which is derived from any suitable source, is intercepted by the inclined surfaces of the wind-guides of the shutters and directed thereby upwardly through the mesh or openings 3 of the sieve so as to separate the chaff and dust from the grain and permit the latter as it passes over the sieve surface to fall through said mesh or openings in a cleaned state, while the separated chaff and dust is carried off through other channels.

I wish it to be understood that I do not desire to be limited to the exact details of construction shown and described, for obvious modifications will occur to one skilled in the art.

Having thus described my invention, what I claim as new and desire to secure by Letters Patent, is,—

1. A sieve, comprising a frame, a separator sheet secured to the top of the frame, a plurality of parallel strips slidable on the upper surface of the separator sheet, a series of parallel bars slidingly held in contact with the under side of the separator sheet and attached to the strips transversely thereof whereby to move therewith, said bars having their ends slidingly supported by the frame and serving as truss members for supporting the separator sheet and also having depending wings each forming unbroken wind-guides for a plurality of alining sieve mesh, and mechanism for moving the strips to effect a movement of the bars to adjust the size of the associated mesh.

2. A screen or sieve comprising a suitably supported plate having a multiplicity of openings cut therein, longitudinally movable bars in contact with the upper surface of said plate, a plurality of metal strips in sliding contact with the under side of said plate and having fixed connection with said bars through slots in the plate whereby a movement of the bars effects a lateral movement of said strips across the openings in the plate, said strips forming supporting truss for the plate and each having a wing projecting downwardly from one side thereof for substantially its entire length, a rock-shaft associated with the sieve and carrying arms, and rods connecting the bars and rock-shaft arms to adapt an oscillation of the shaft to effect a movement of the shutters whereby to change the mesh of the sieve.

3. A sieve having a plurality of shutters adjustably carried at the under side thereof to permit a variance of the size of the mesh, said shutters being supported by the sieve frame and each having a dependent wing provided on one side thereof and serving both as a wind-guide for a plurality of mesh and as a truss for the sieve.

In testimony whereof I have hereunto signed my name to this specification in the presence of two subscribing witnesses.

WILLIAM C. BLACK.

Witnesses:
C. W. OWEN,
HAZEL B. HIETT.